(No Model.) 7 Sheets—Sheet 1.

C. R. BANNIHR.
MACHINE FOR MAKING PAPER BOXES.

No. 508,594. Patented Nov. 14, 1893.

(No Model.) 7 Sheets—Sheet 4.

C. R. BANNIHR.
MACHINE FOR MAKING PAPER BOXES.

No. 508,594. Patented Nov. 14, 1893.

Witnesses.
J. H. Shumway.
Lillian D. Kelsey.

Caesar R. Bannihr,
Inventor.
By atty.
Earle Seymour (No Model.) 7 Sheets—Sheet 5.
C. R. BANNIHR.
MACHINE FOR MAKING PAPER BOXES.
No. 508,594. Patented Nov. 14, 1893.
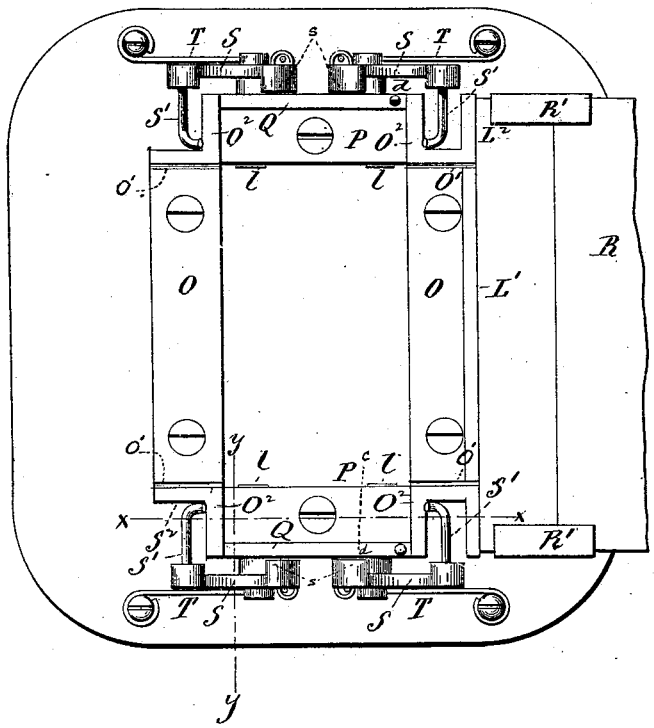
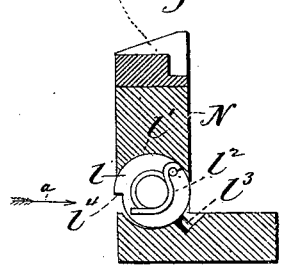
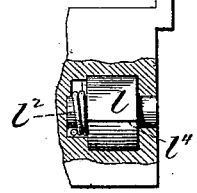
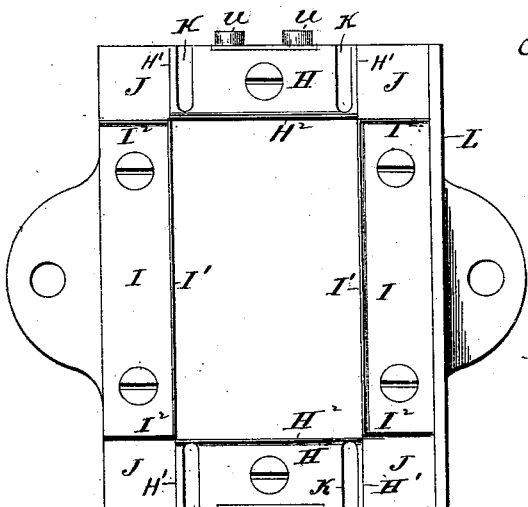
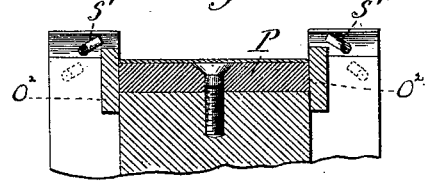
Witnesses.
J. N. Shumway.
Lillian D. Kelsey.
Caesar R. Bannihr
Inventor.
By attys
Earle & Seymour (No Model.) 7 Sheets—Sheet 6.

C. R. BANNIHR.
MACHINE FOR MAKING PAPER BOXES.

No. 508,594. Patented Nov. 14, 1893.

(No Model.) 7 Sheets—Sheet 7.
C. R. BANNIHR.
MACHINE FOR MAKING PAPER BOXES.
No. 508,594. Patented Nov. 14, 1893.
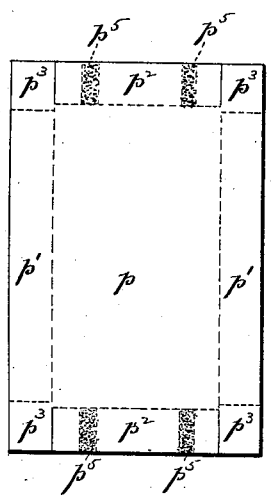
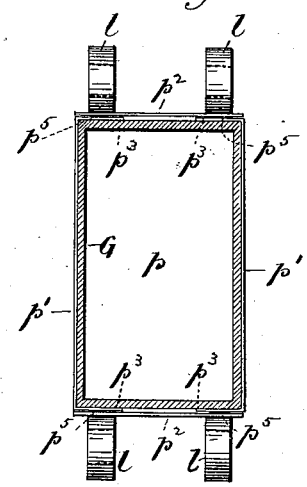
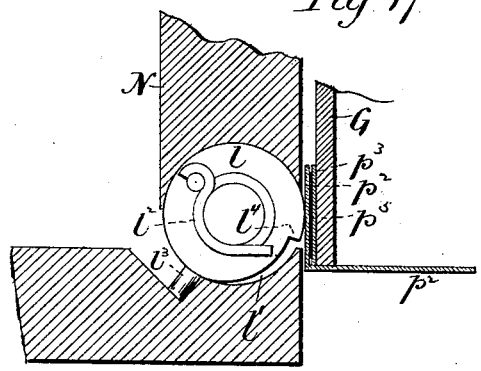

UNITED STATES PATENT OFFICE.

CAESAR R. BANNIHR, OF WEST CHESHIRE, CONNECTICUT.

MACHINE FOR MAKING PAPER BOXES.

SPECIFICATION forming part of Letters Patent No. 508,594, dated November 14, 1893.

Application filed January 4, 1892. Serial No. 416,945. (No model.)

*To all whom it may concern:*

Be it known that I, CAESAR R. BANNIHR, of West Cheshire, in the county of New Haven and State of Connecticut, have invented a new Improvement in Machines for Making Paper Boxes; and I do hereby declare the following, when taken in connection with the accompanying drawings and the letters of reference marked thereon, to be a full, clear, and exact description of the same, and which said drawings constitute part of this specification, and represent, in—

Figure 1:
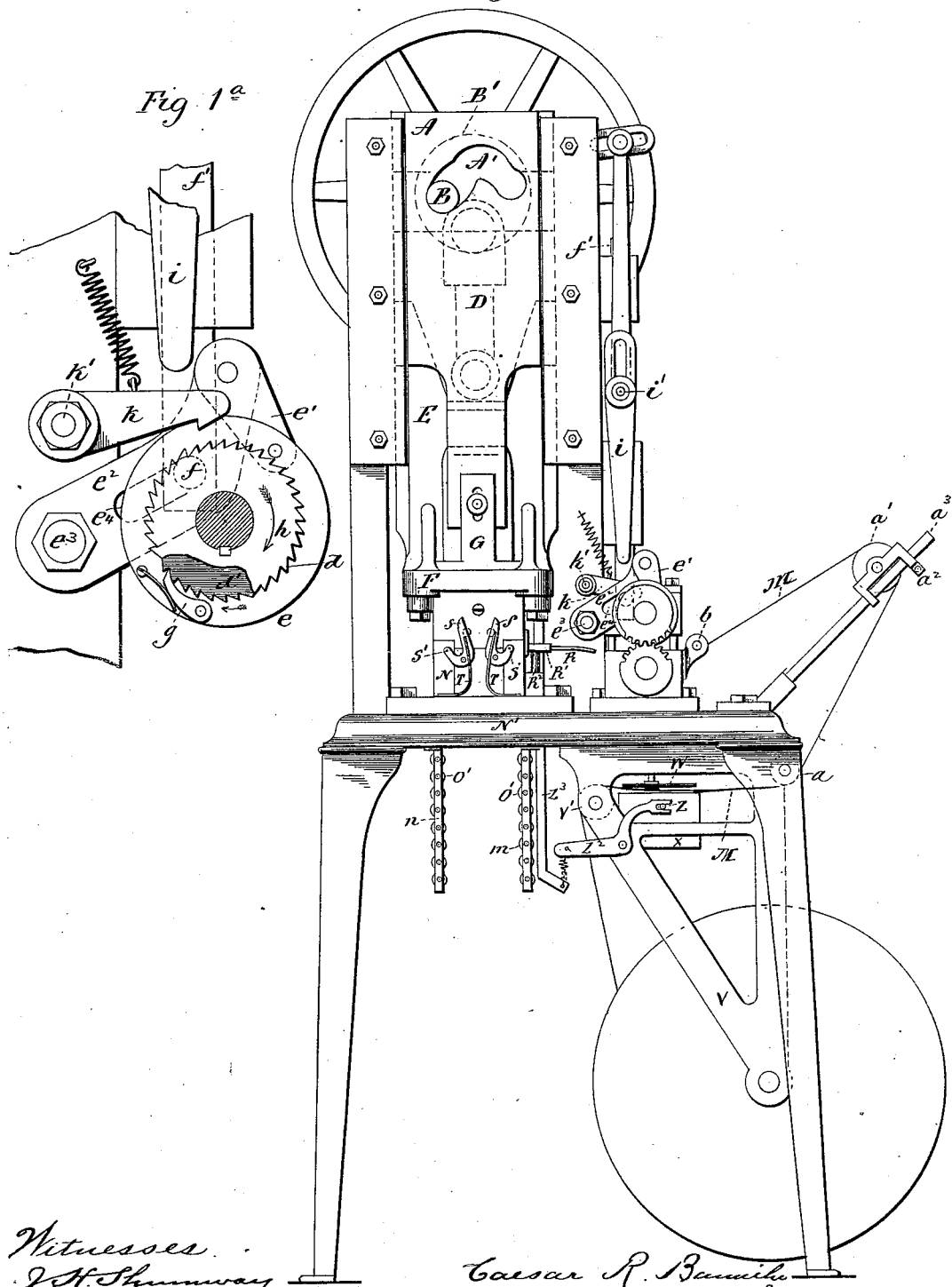
Figure 2:
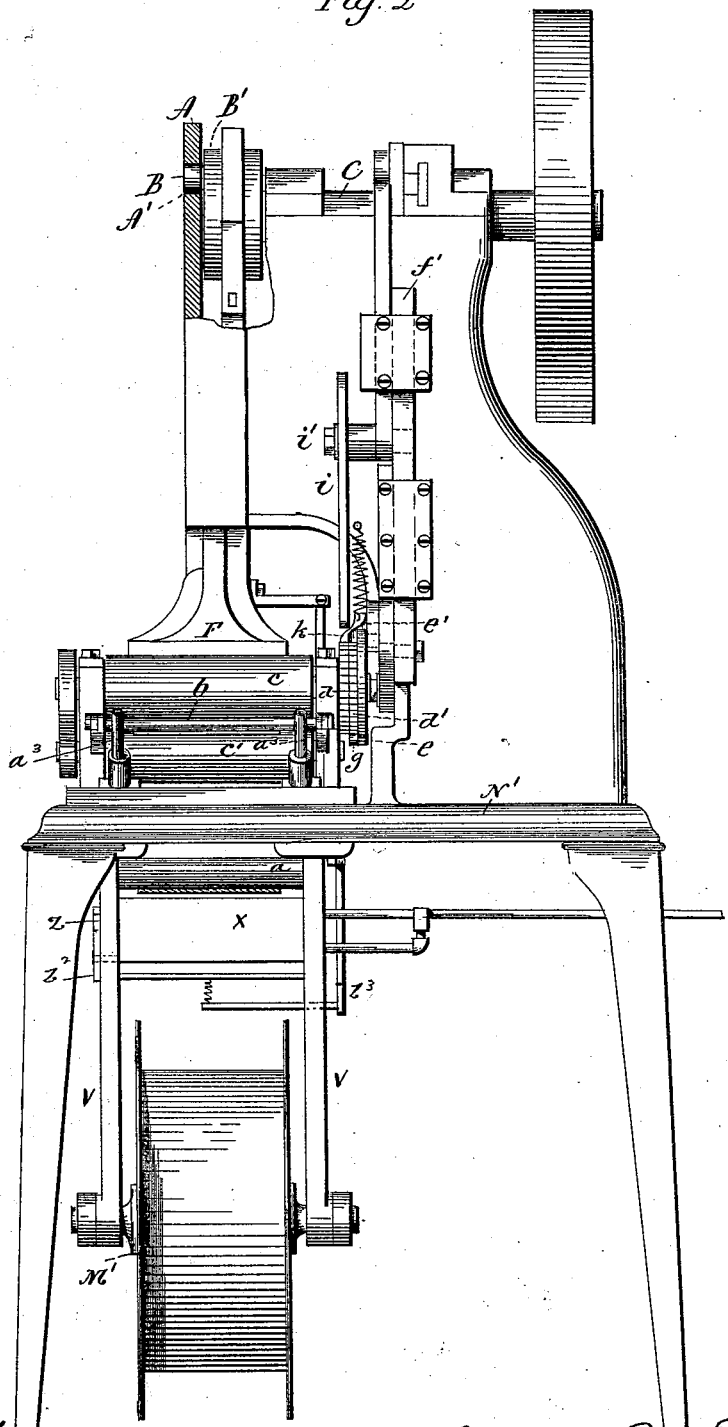
Figure 3:
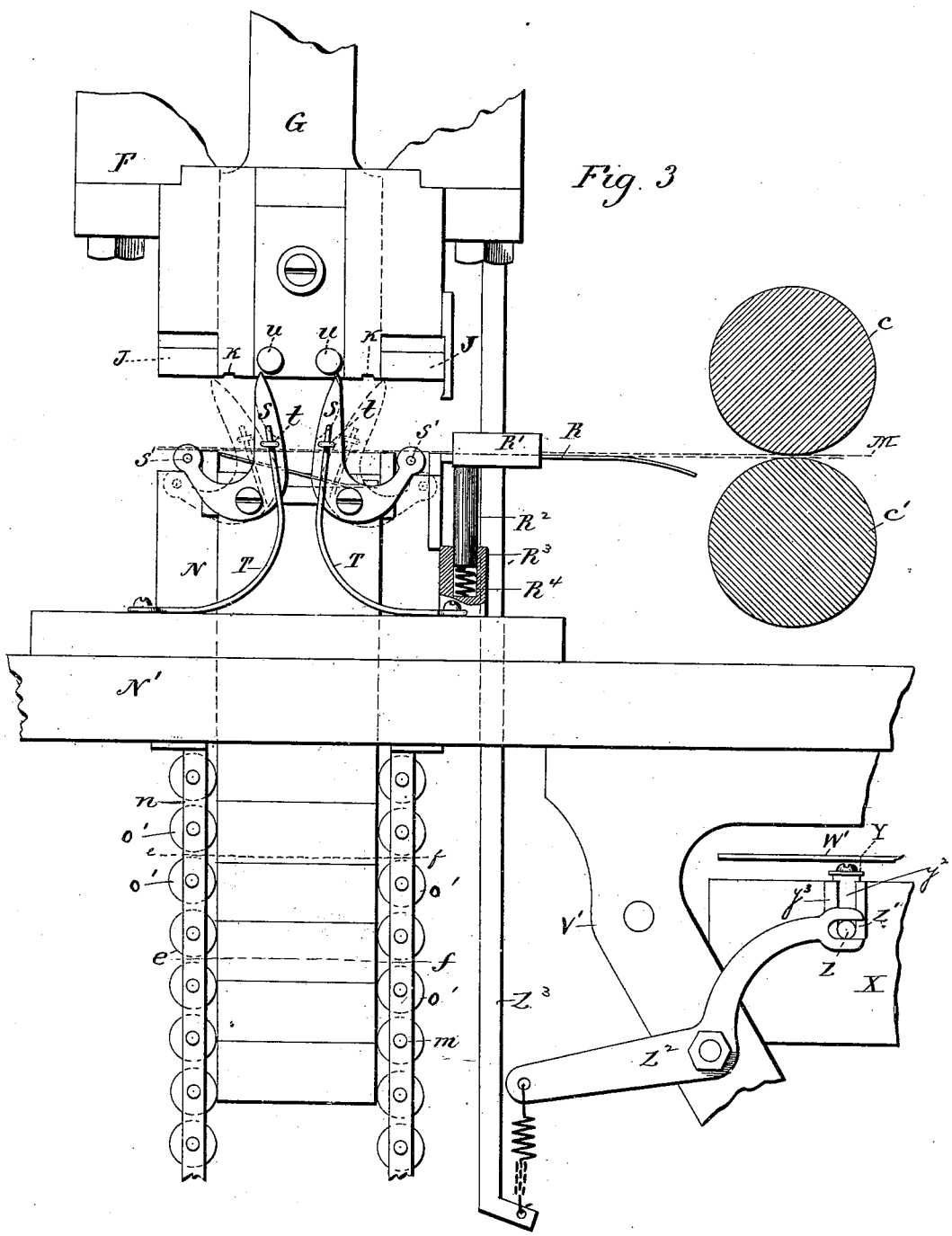
Figure 4:
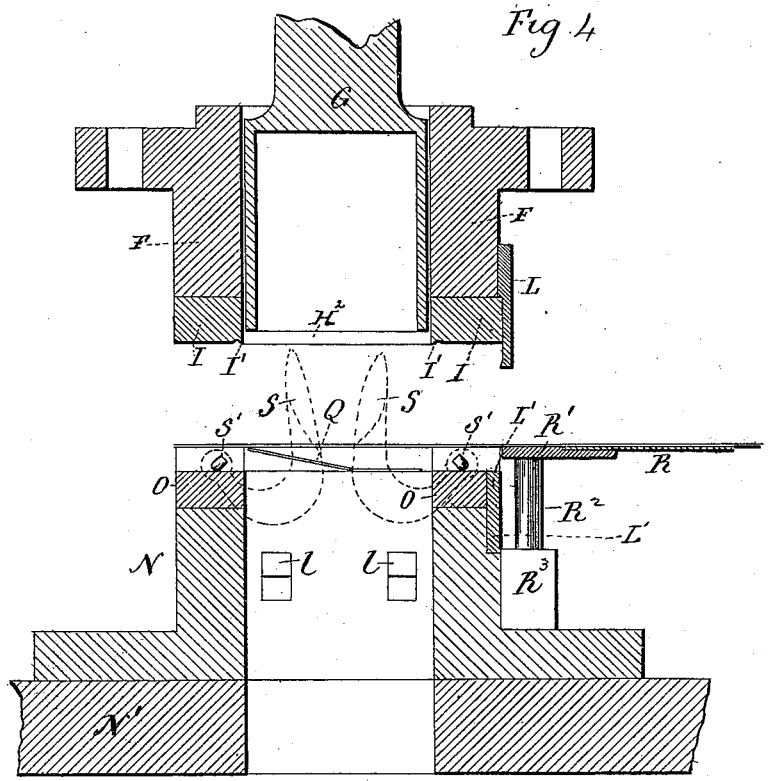
Figure 5:
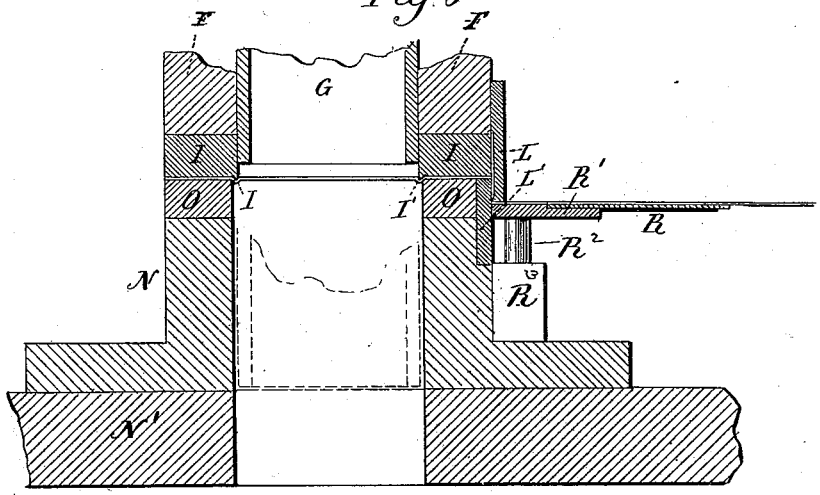
Figure 12:
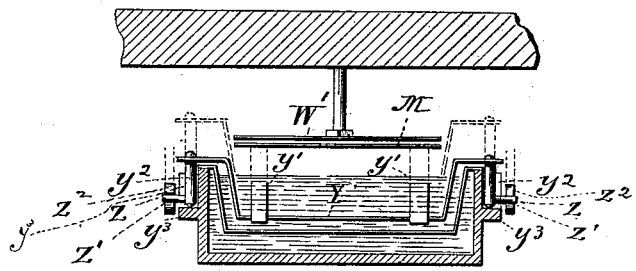
Figure 13:
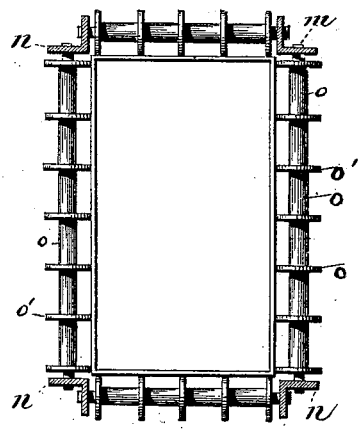
Figure 15:
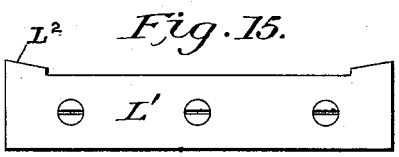

Figure 1, a view in front elevation of a machine constructed in accordance with my invention. Fig. 1ª, is a detached enlarged view of the feeding mechanism thereof. Fig. 2, is a view of the machine in side elevation. Fig. 3, is a broken detached view showing the upper and lower dies, the supplemental folding mechanism, the feed-rolls, the drying cage and the gumming mechanism. Fig. 4, is a view in vertical transverse section of the upper and lower dies and the punch, the said upper die and the punch being shown in their elevated positions and the stock-strip being shown as fed into position for being cut-off, scored and folded. Fig. 5, is a similar view of the same parts with the upper die closed down upon the lower die for cutting off a box-blank from the stock-strip and scoring and slitting the said blank. Fig. 6, is a detached plan view of the lower die and the supplemental folding mechanism. Fig. 7, is a similar face view of the upper die. Fig. 8, is a view of the lower die in vertical transverse section on the line $x$—$x$ of Fig. 6. Fig. 9, is a similar view in vertical longitudinal section on the line $y$—$y$ of the same figure. Fig. 10 is a view of the lower die in vertical section on the line $c$—$d$ of the same figure, and showing one of the compressing cams in end elevation. Fig. 11 is a broken view in inside elevation taken from a point indicated by the arrow $a$ in Fig. 10, and showing a face view of the same cam. Fig. 12 is a view of the gumming apparatus in vertical longitudinal section. Fig. 13 is a view in horizontal section on the line $e$—$f$ of Fig. 3, of the drying cage or chute. Fig. 14 is a plan view of a blank scored, cut and gummed preparatory to being folded. Fig. 15 is a detached face view of the lower knife L' which, when in use, is attached to the lower die. Fig. 16 is a plan view of a box made in my improved machine, and drawn so as to show the relative folded positions of its side, end and corner flaps, the said view also showing the folding-punch in transverse section, and the compressing cams, when the said punch and cams are in position to co-operate in squeezing the end and corner flaps of the blank together, to better incorporate with them the gum, which is shown by short, heavy, black lines. Fig. 17 is an enlarged view in vertical section on a line, not shown, but parallel with, and close to the line $y$—$y$, of Fig. 6, this view also showing how the compressing cams and folding punch co-operate to make the gum take effect.

My invention relates to an improvement in machines for making paper-boxes, the object being to produce a simple, compact, durable and easy-running machine, of few parts and therefore simple to construct and maintain in running order, having a large capacity for work, and adapted to be readily converted for making boxes of different sizes.

With these ends in view, my invention consists in a machine having certain details of construction and combinations of parts as will be hereinafter described and pointed out in the claims.

In carrying out my invention, I employ a press, having slides A, and E, the former being constructed with a cam-slot A', which receives an eccentric crank-pin B, mounted in a collar B', secured to the driving-shaft C. The folding-punch G, is fastened to the lower end of the said slide A. The slide E, is located below the slide A, and is constructed at its upper end with a bridge to which is attached the lower end of a pitman D, the upper end whereof is connected with the said shaft C, which actuates it, and hence the slide E, which has bolted to its lower end, by bolts $f$ the upper die F. As the press is of ordinary and well known construction, it is thought that a more detailed description or illustration of it is not necessary for an understanding of the present invention. The said upper die F, is an open rectangle in form, the dimensions of its opening corresponding to the dimensions of the boxes to be made. It is provided upon its lower face with end face-plates H H, and side face-plates I I, the said plates being of hardened steel, and the side plates including the end plates between them. The ends of the side plates are beveled or cut away to form clearance spaces J, J, J, J, (Fig. 7) respectively located at the four corners of the die, and leaving the ends of the end plates exposed for operation as cutting edges, which to better distinguish, I have designated by H'. The inner edges of the side plates are constructed with scoring edges I' I', while the inner edges of the end plates are constructed with corresponding scoring edges $H^2 H^2$.

It will be noticed by reference to Fig. 7 of the drawings, that although the scoring edges I' I' are parallel with the cutting edges H', they are not in line with the same, but set inward for a distance about equal to the thickness of the paper used in making the boxes, whereby the sides of the boxes will be scored, and therefore folded on lines set within, by the thickness of the paper, the line on which the ends of the boxes are cut, so that when the boxes are folded, the edges of the ends of the boxes will be just flush with the outer faces of their sides. The side plates I, I, are also constructed with scoring edges $I^2$, respectively located at a right angle to their scoring edges I', and forming lines of demarcation between the faces of the said side pieces and the clearance spaces J, before mentioned.

It will be noticed by reference to the same figure of the drawings, that although the scoring edges $i^2$ are parallel with the scoring edges $H^2$ of the end pieces, they are set out of line, and within the same for a distance equal to the thickness of the paper to be scored, whereby the corners of the boxes will be scored and folded the thickness of the paper within the lines on which the ends of the boxes are scored and folded. Each end of the said end face-plates H, H is constructed with a transverse recess K, (Fig. 7) opening outward, and designed to clear the glue on the stock-strip, M, and prevent it from smearing the die. One edge of the die is provided with a knife L, which projects below its face, and cuts the box-blanks from the stock-strip M, thereto co-operating with a corresponding knife L', secured to the corresponding edge of the open rectangular lower die N, which is firmly bolted to the bed N' of the press. The said lower die N, has screwed to its upper face two hardened steel side face-plates O O, and two similar end face-plates P P, the latter being included within the ends of the former. The opening of the lower die N, is made just enough larger than the opening of the upper die F, to permit the scoring edges I' and $H^2$ of the side and end face plates of the said upper die to pass the corresponding edges of the plates O and P, as shown by Fig. 5 of the drawings, the said plates O, being constructed with transverse scoring grooves O', located at a right angle to their inner edges, and extending parallel with the inner edges of the plates P, but out of line and within the same by the thickness of the paper to be folded into boxes. From the said scoring grooves O', (Fig. 6) the ends of the side plates O are upwardly inclined in correspondence with the depressions or clearance spaces J of the upper die, so as to form inclined shearing knives $O^2$, which co-operate with the cutting edges H', of the end faceplates of the upper die in cutting the corners of the box-blanks. The inclination of the shearing edges $O^2$, is incidental to upwardly inclining the ends of the plates O, of the lower die, which is done for the purpose of developing and sustaining the corner-flaps of the blanks, on a higher level than their side and end flaps and their central portions. The ends of the knife L' which co-operate with the knife L, are also inclined as at $L^2 L^2$, to correspond to the inclination of the adjacent shearing edges $O^2 O^2$, whereby the ends of the box-blanks are cut from the stock-strip just before their central portions. It is not to be understood that the inclined ends $L^2 L^2$ of the knife L' have any direct connection with the cutting edges $O^2$, more than that the said edges $L^2 L^2$ begin to cut the blank from the stock-strip, cutting inwardly from the edges thereof, at the same time that the co-operating edges $O^2$ and H' begin to cut the ends of the blank, between its side edges, to develop its corner flaps. Two clearance springs Q Q, located between the inclined shearing knives $O^2$, and rising from the inner toward the outer edge of the die, are designed to prevent the forward edge of the stock-strip from engaging with the outer pair of the shearing edges as it is moved over the die from the vertically movable cutting table R, which is provided at each edge with a guard R', and upon its lower face with two vertical pins $R^2$, which fit into sockets $R^3$, formed integral with the die N, and containing spiral springs $R^4$, which exert a constant tendency to lift the table above the face of the lower die. The said springs Q, Q, are not, however, new with me, and I do not claim them. The folding punch G, before referred to, is made hollow for lightness, and adapted in its external dimensions to be moved up and down within the said upper and lower dies.

By constructing the faces of the dies as described, i. e., the lower die with elevated corners, and the upper die with corresponding clearance spaces, the corners of the box-blanks will be given such a start toward right folding that I may if desired operate my improved machine without supplemental corner-folding mechanism, for the corners of the blank being formed and supported above the level of its sides, ends and central portion, will have a very considerable start, so to speak, over the sides and ends of the blank, when the folding-punch G begins to work, and being started ahead of the end flaps, must fall within the same, as designed, when the side flaps of which the corner flaps form flexible continuations are brought into their folded positions; but as in some cases such mechanism may be desirable for insuring absolute reliability of operation, I have chosen to represent a form of mechanism that may be used herein. It consists of two pairs of bowed operating-levers S S (Figs. 4 and 6) respectively pivoted to the ends of the lower die, both the upper and lower ends of the said levers extending above the face of the said die. Each lever is provided with a spring T, the upper end whereof passes freely through a staple $t$, secured to its outer face, the lower ends of the said springs being fastened to the flanged base of the lower die. The upper end of each of the said levers is furnished upon its inner face with a long, narrow cam $s$, while the lower end of each lever is furnished with an inwardly projecting folding finger S', formed, as herein shown, of wire, the said fingers extending into clearance spaces $S^2$, formed in the ends of the side face plates O O, of the lower die, and therefore situated in the corners thereof. Under this construction the said folding fingers are located directly below the corners of the box-blanks as the same rest upon the face of the lower die. The said levers are operated by two pairs of pins U U, respectively located in the ends of the upper die, which, when it is depressed, engage the pins with the inner faces of the said cams between which they pass, separating the upper and lower ends of the levers against the tension of their springs T, which restore the levers to their normal positions, just as soon as the said pins pass below the cams, so that when the upper die begins its upward movement the pins engage with the outer faces of the cams and positively draw the levers together, against the tension of the springs T T whereby their lower ends are lifted and with them the said folding-fingers which rise above the inclined ends of the said side face-plates O O, carrying the corners of the box-blanks with them, and thus folding the said corners in advance of the ends of the blanks. It may be said here, that in the normal positions of the levers S S their upper ends are in right separation for the pins U U to engage with the inner faces of the cams $s$ $s$, when the upper die descends, the said springs yielding to let the levers move in either direction, but normally holding them, as aforesaid, in position for the engagement of the said pins with the inner faces of the said cams. It is apparent that folding mechanism constructed on this principle, that is, to be actuated by springs and the movement of the upper die, may take different forms, and I do not limit myself to the particular construction shown.

The stock-strip M, before mentioned, is coiled on a drum M', hung between two hangers V V, depending below the bed of the press, as seen in Figs. 1 and 2 of the drawings. From the coil the strip is led over a small roller V', journaled between the said hangers near their upper ends, and thence under a horizontal plate W', located over the gumming apparatus, which is best shown in Fig. 12 of the drawings, and consists of a double-walled receptacle X, adapted to have hot water or steam introduced into it between its walls, to sustain the temperature of its contents. A light frame Y, preferably formed of wire, is bent into the shape of the containing chamber of the receptacle, and furnished with two gummers $y'$ $y'$, adapted in shape and arranged in location so as to rightly apply two patches of gum to the strip every time that they are lifted, the strip being meanwhile sustained against vertical movement by the plate W' before mentioned. The ends of the said frame Y are attached to vertical guides $y^2$, confined in bearings $y^3$, formed upon the outer edges of the receptacle X. The said guides are provided at their lower ends with outwardly projecting pins Z, which enter slots Z' formed in the outer ends of operating-levers $Z^2$, hung upon the hangers and actuated by an operating rod $Z^3$, with which they are connected in any convenient manner, and which is operated by the action of the press. After being gummed, the stock-strip passes over a small roller $a$, thence over a larger roller $a'$, mounted in a sliding frame $a^2$, supported upon inclined arms $a^3$, bolted at their lower ends to the frame of the press, the said sliding frame $a^2$, being adjustable on the arms $a^3$, for the purpose of lengthening or shortening the period between the gumming of the strip and its entrance to the dies. From the roller $a'$, the strip passes under a small roller $b$, and thence between feed-rolls $c$ $c'$, which are geared together. These feed-rolls may be operated in any desired manner.

As herein shown, I have mounted two ratchet wheels $d'$ $d'$ on the shaft of the upper roll $c$, the said wheels not being rotatable, except with the shaft, upon which I have also mounted a disk $e$, which is free to rotate upon the shaft, and which is connected by a link $e'$ with a bent lever $e^2$, hung at its opposite end upon a stud $e^3$, entering the frame of the press, and constructed with an elongated slot $E^4$, which receives a pin $f$, mounted in the lower end of an operating-rod $f'$, the upper end of which is connected with the driving-shaft C, of the press, by means which I need not detail. The said disk $e$, carries a spring-actuated pawl $g$, which engages with the teeth of the ratchet-wheel $d'$.

It will be seen by reference to Fig. 1ª of the drawings, that when the operating-bar $f'$, is depressed by the action of the press, the disk $e$, will be rotated in the direction of the arrow $h$, this motion being communicated to the wheel $d'$ by means of the pawl $g$, whereby the feed-roll $c$, and hence the feed-roll $c'$, are driven. In order, however, that the impulse derived from the downward movement of the operating-rod $f'$ may not result in turning the feed-rolls $c$ $c'$ too much, I employ a stop motion, which consists, as herein shown, of an adjustable operating-finger $i$, having its upper end slotted, and secured by a stud $i'$ to the said operating-rod $f'$. The lower end of this finger $i$ is arranged for engagement with a spring-lifted stop-dog $k$, hung on a stud $k'$, entering the frame of the press, and arranged for engagement with the teeth of the ratchet-wheel $d$, the dog being depressed to engage with the said teeth in time to prevent the shaft to which the said wheel is keyed, from being turned too far, for although the pawl $g$, is positive in turning the feed rolls in the direction in which they feed the stock-strip, it does not restrain them from being turned too far in case the impulse from the rod $f'$ is in excess of what is needed to drive the rolls just far enough, and no more, to feed the stock-strip the distance represnted by the width of one blank. Some stop motion, therefore, is necessary to stop the feed of the strip at a pre-determined time, for the impulse derived from the downward movement of the operating-rod $f'$ cannot be gaged closely enough to be relied upon.

In Figs. 4, 6, 10 and 11 of the drawings I have shown each end of the lower die as being provided with a pair of compressing cams $l$, which are located so as to compress the ends of the folded boxes where the same are glued, the adhesive material being indicated by $p^5$, in Figs. 14, 16 and 17 of the drawings. These cams are located in recesses $l'$, formed in the ends of the said lower die, so as to project very slightly beyond the inner walls thereof, and are provided with spiral springs $l^2$, by means of which they are recovered after the box has passed them, and with stops $l^3$ and $l^4$ which determine their rotation in opposite directions.

Below the lower die I locate a drying cage or chute which as herein shown, consists of a rectangular frame, composed of horizontal wires $m$, the ends whereof are inserted into four vertical angle plates $n$, which are secured to depend from the lower bed $N'$. Small tubes $o$ and disks $o'$, are alternately arranged upon these wires, the boxes being engaged with the said disks which turn freely so as to reduce to the minimum the friction of their passage through the cage, which being very open, permits the boxes to dry rapidly.

In Fig. 14 I have shown a scored and cut box-blank, all ready for folding, the said blank consisting of a bottom portion $p$, sides $p'$ $p'$, ends $p^2$ $p^2$, and corners $p^3$, $p^3$, $p^3$, $p^3$.

It will be noticed that the sides, ends and corners are scored out of line, and that where the blank is cut as at $p^4$, $p^4$, $p^4$, $p^4$, no stock is removed. The stippled spaces inclosed by broken lines on the end portions $p^2$ of the box blank indicate adhesive material $p^5$.

Having fully described in detail the construction of my improved machine, I will proceed to briefly set forth the mode of its operation. The gummed end of the stock-strip having been moved over the lower die, the upper die comes down and cuts the said end of the strip off and slits its corners and scores the blank thus formed. The upper die is then lifted and the folding punch comes down to fold the scored and cut box-blank. As the blank folds, its corners have the start, so to speak, over its sides and ends, as they are sustained at an elevation above the level of the same, as before described, and then as its sides fold inward they (i. e. the corners) will fall within the ends of the blank which are folded last. The blank being so folded, is then pushed down through the lower die, past the compressing cams therein, and into the drying cage or chute, from which they are finally expelled by the pressure of similarly folded boxes above.

In view of the suggestions made herein, I would have it understood that I do not limit myself to the exact construction herein shown and described, but hold myself at liberty to make such changes and alterations therein as fairly fall within the spirit and scope of my invention.

I am aware that the use, in a paper-box machine, of a double-walled steam-heated reservoir for the adhesive material employed, is old, and also that it is old to employ a gummer adapted to apply the adhesive material to the stock-strip in isolated spots or patches. I do not, therefore, claim either of those constructions broadly.

Having fully described my invention, what I claim as new, and desire to secure by Letters Patent, is—

1. In a machine for making paper-boxes, the combination with an upper, open rectangular die having a clearance space at each of its corners, and two cutting edges at each of its ends, the said edges being parallel with but located outside of the side scoring-edges of the die, and forming walls of the said spaces; of a similar lower die having at each end two inclined elevated knives adapted to support the corners of the blanks above the level of the other portions thereof, to enter the respective clearance spaces at the corners of the upper die, and to coact with the said cutting edges of the said die in cutting the ends of the blanks to form the corners of the same; and a folding punch constructed to fit into the said dies, substantially as set forth, and whereby the corners of the blanks are formed and supported above the sides and ends thereof, and have the start of the same when the blanks are folded.

2. In a machine for making paper-boxes, the combination with an upper die having side face-plates, and end face-plates located between the same, the ends of the said side face plates being cut away to form clearance spaces at the respective corners of the die, and the ends of the end face-plates being thus exposed to act as cutting edges; of a similar lower die having side face-plates, and end face-plates located between the same, the ends of the former being elevated to support the corners of the blanks above the level of the other portions thereof, and adapted to enter the said clearance spaces of the upper die, and forming inclined knives which coact with the said edges; and a folding punch constructed to fit into the said die, substantially as set forth, and whereby the corners of the blanks are formed and supported above the sides and ends thereof, and have the start of the same when the blanks are folded.

3. In a machine for making paper-boxes, the combination with an upper, open rectangular die having a clearance space at each of its corners, and two cutting edges at each of its ends, the said edges being parallel with but located outside of the side scoring edges of the die, and forming walls of the said spaces; of a similar lower die having at each end two inclined elevated knives adapted to support the corners of the blanks above the level of the other portions thereof, to enter the respective clearance spaces at the corners of the upper die, and to coact with the said cutting edges thereof in cutting the ends of the blanks to form the corners of the same; a folding punch constructed to fit into the said dies, a knife attached to one side of the upper die, and a knife attached to the corresponding side of the lower die, and having inclined ends corresponding to the said inclined knives of the said die, substantially as set forth, and whereby the corners of the blanks are formed and supported above the sides and ends thereof, and have the start of the same when the blanks are folded, substantially as described.

4. In a machine for making paper-boxes, the combination with an upper, open rectangular die having a clearance space at each of its corners, and two cutting edges at each of its ends, said edges being parallel with but located outside of the side scoring edges of the die, and forming walls of the said spaces; of a similar lower die having at each end two inclined elevated knives adapted to support the corners of the blanks above the level of the other portions thereof, to enter the respective clearance spaces at the corners of the upper die and to coact with the said cutting edges thereof in cutting the ends of the blanks to form the corners of the same; a folding punch constructed to fit into the said dies; a vertically movable cutting table located on one side of the lower die, a knife located on one side of the upper die, and arranged to depress the said table when the said die descends, and a knife located on the corresponding side of the lower die, and below the normal level of the said table, and having its ends inclined in correspondence with the elevated inclined knives of the lower die, substantially as described.

5. In a machine for making paper-boxes, the combination with an upper, open rectangular die having a clearance space at each of its corners, and two cutting edges at each of its ends, the said edges being parallel with but located outside of the side scoring edges of the die, and forming walls of the said spaces; of a similar lower die, having a clearance space at each of its corners and having at each end two inclined elevated knives adapted to support the corners of the blanks above the level of the other portions thereof, to enter the respective clearance spaces at the corners of the upper die, and to coact with the cutting edges of the upper die in cutting the ends of the blanks to form the corners of the same; a folding punch constructed to fit into the said dies, and folding mechanism entering the clearance spaces at the corners of the lower die for lifting the elevated corners of the blanks, substantially as described, and whereby the corners of the blanks are formed and supported above the sides and ends thereof, and have the start of the same when the blanks are folded.

6. In a machine for making paper-boxes, the combination with an open, rectangular upper die, having its ends constructed with parallel clearance recesses, of an open rectangular lower die, a folding punch coacting with the said dies, and gumming apparatus adapted to apply to the stock-strip isolated patches of gum, tallying with the said recesses in the upper die, substantially as described, and whereby the smearing of gum upon the upper die is avoided.

7. In a machine for making paper-boxes, the combination with an upper and a lower open rectangular die, of two spring-actuated folding levers attached to each end of one of the said dies, and each having a folding finger extending into a clearance space on the adjacent corner of the die, means carried by the other die for engaging with and operating the said levers when the dies are brought together, and a folding punch constructed to fit into the said dies, substantially as described.

8. In a machine for making paper-boxes, the combination with an upper and a lower open rectangular die, of two spring-actuated folding levers attached to each end of the lower die, their upper ends extending above the face of the same, and their lower ends each having a folding finger extending into a clearance space in the adjacent corner of the die; means carried by the upper die for engaging with and operating the said fingers when the dies are brought together, and a folding punch constructed to fit into the said dies, substantially as described.

9. In a machine for making paper-boxes, the combination with an open rectangular lower die having recesses in its end walls; of spring-recovered smooth-faced compressing cams journaled in said recesses and projecting very slightly beyond the inner face of the die, substantially as described.

10. In a machine for making paper boxes, the combination with a double-walled receptacle for the adhesive material, of means for heating the space between the said walls, a wire frame bent to the form of the receiving chamber of said receptacle, two parallel gumming blocks mounted transversely on said frame, near the end thereof a fixed platen located above the said blocks, vertical guides attached to the ends of the said frame and provided at their lower ends with pins, boxes located on the opposite ends of the receptacle, and confining said guides to vertical movement, operating-levers connected with the said pins, and means for actuating the said levers, substantially as described.

11. In a machine for making paper-boxes, the combination with two feeding rolls geared together, of a ratchet-wheel secured to the shaft of the upper roll, a disk loosely mounted on the same shaft, a spring-actuated pawl pivoted to the disk in position to engage with the teeth of the ratchet, a link having one end pivoted to the said disk, a slotted pivotal arm having said link swung from its outer end, an operating-bar connected with the said arm through its slot, another ratchet-wheel non-rotatably mounted on the same shaft, a spring recovered stop-dog, and an operating-finger for throwing the said dog into engagement with the ratchet-wheel last mentioned, substantially as described.

12. In a machine for making paper-boxes, an open rectangular anti-friction drying-cage or chute, consisting of rods arranged in the form of a rectangular frame, and disks and tubes alternated on said rods, substantially as described.

13. In a machine for making paper-boxes an open rectangular anti-friction drying-cage or chute, consisting of four vertical angle-plates, horizontal rods mounted in the said plates to form a rectangular frame, and disks and tubes alternated on said rods, substantially as described.

In testimony whereof I have signed this specification in the presence of two subscribing witnesses.

CAESAR R. BANNIHR.

Witnesses:
WILLIS B. FRENCH,
EDWARD D. BRISTOL.